(12) United States Patent
Potts et al.

(10) Patent No.: US 12,452,098 B2
(45) Date of Patent: Oct. 21, 2025

(54) NODE RE-MAPPING TECHNIQUE FOR A BUS-BASED COMMUNICATION SYSTEM

(71) Applicant: GM Global Technology Operations LLC, Detroit, MI (US)

(72) Inventors: Michael Potts, Lenox Township, MI (US); Sudhakaran Maydiga, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 378 days.

(21) Appl. No.: 18/344,177

(22) Filed: Jun. 29, 2023

(65) Prior Publication Data

US 2025/0007748 A1    Jan. 2, 2025

(51) Int. Cl.
*H04L 12/40*    (2006.01)

(52) U.S. Cl.
CPC ............. *H04L 12/40006* (2013.01); *H04L 2012/40215* (2013.01); *H04L 2012/40273* (2013.01)

(58) Field of Classification Search
CPC . H04L 12/40; H04L 12/40006; H04L 12/403; H04L 12/40143; H04L 61/5038; H04L 61/3015; H04L 2012/40215; H04L 2012/40273
See application file for complete search history.

(56) References Cited

U.S. PATENT DOCUMENTS

| | | | | |
|---|---|---|---|---|
| 7,739,435 B2* | 6/2010 | Gideons | ............. | G06F 13/4291 710/110 |
| 2010/0315331 A1* | 12/2010 | Cheng | ................... | G06F 3/1446 345/156 |
| 2021/0006429 A1* | 1/2021 | Shen | ................... | G06F 13/4068 |

* cited by examiner

*Primary Examiner* — Rasheed Gidado
(74) *Attorney, Agent, or Firm* — Vivacqua Crane, PLLC

(57) ABSTRACT

A bus-based communication includes a primary node, one or more secondary nodes that are each assigned an original node identifier, and a bus electrically connecting the primary node and the one or more secondary nodes with one another based on a bus-based communication protocol. The bus-based communication protocol defines a predefined number of sequentially numbered available node identifiers, and the original node identifier assigned to each secondary node corresponds to one of the sequentially numbered available node identifiers defined by the bus-based communication protocol of the bus. The primary node implements a re-mapping technique that re-numbers the original node identifiers assigned to the secondary nodes.

20 Claims, 3 Drawing Sheets

NODE RE-MAPPING TECHNIQUE FOR A BUS-BASED COMMUNICATION SYSTEM

INTRODUCTION

The present disclosure relates to a bus-based communication system including a primary node and a plurality of secondary nodes. The primary node implements a node re-mapping technique that re-numbers the original node identifiers assigned to the secondary nodes into updated node identifiers that are sequentially numbered to improve communication latency.

Ethernet is an effective and ubiquitous approach to establish communication between two or more physical devices, which are also referred to as nodes, that are part of a network. An Ethernet communication protocol defines the specific types of physical devices that are required by a network such as, for example, the type of cable, the topology, and the maximum length of cables. In one specific example of an Ethernet communication protocol, the 10Base-T network protocol designates the number "10" to indicate the speed of transmission at ten megabits per second, the word "base" to stand for baseband, and the letter "T" designates a twisted pair cable.

Collision avoidance techniques are widely used in telecommunications and computer networks to avoid resource contention. Specifically, collision avoidance techniques attempt to eliminate situations where multiple nodes attempt to access the same resource. This ensures that any node in a network may transmit a signal without colliding with other traffic on the network. The 10Base-T communication protocol employs physical layer collision avoidance (PLCA) to prevent collisions when multiple nodes attempt to send data simultaneously. In PLCA, a transmit opportunity is allocated to each node in a round-robin fashion, where only one node is allowed to transmit data at any time. Each node is assigned a node identifier, starting with a coordinating node that is allocated the identifier zero (PHY ID=0) and ending with the last node in the network that is allocated the identifier 255 (PHY ID=255). The 10Base-T communication protocol includes a total of two hundred and fifty-six available node identifiers. However, in many instances the network does not utilize all the available node identifiers. It is to be appreciated that every sequential node identifier is given an opportunity to transmit data, regardless of if a physical device is assigned to a specific node identifier. For example, if there is a gap in numbering between a node allocated the identifier 200 and another node allocated the identifier 255, then the network still allocates opportunity time to the node identifiers between 200 and 255 to transmit data. Allocating a transmit opportunity to each node identifier regardless of if a device is assigned introduces communication latency to the network.

Thus, while current communication protocols achieve their intended purpose, there is a need in the art for an improved approach for data transmission that reduces communication latency.

SUMMARY

According to several aspects, a bus-based communication system is disclosed, and includes a primary node, one or more secondary nodes that are each assigned an original node identifier, and a bus electrically connecting the primary node and the one or more secondary nodes with one another based on a bus-based communication protocol. The bus-based communication protocol defines a predefined number of sequentially numbered available node identifiers, and the original node identifier assigned to each secondary node corresponds to one of the sequentially numbered available node identifiers defined by the bus-based communication protocol of the bus. The primary node implements a re-mapping technique that re-numbers the original node identifiers assigned to the secondary nodes by removing unused sequentially numbered available node identifiers. The primary nodes re-numbers the original node identifiers by re-numbering the original node identifiers corresponding to the secondary nodes into sequentially numbered updated node identifiers and re-setting a total number of the sequentially numbered available node identifiers equal to a total number of secondary nodes that are part of the bus-based communication system.

In another aspect, a total number of transmission opportunities afforded by the bus-based communication system during a periodic cycle is equal to the total number of secondary nodes that are part of the bus-based communication system.

In yet another aspect, the bus-based communication protocol employs one or more collision avoidance techniques that allocate a transmit opportunity to each node that is part of the bus-based communication system to avoid collisions with traffic on the bus-based communication system.

In an aspect, the bus-based communication protocol is 10Base-T network protocol.

In another aspect, the one or more collision avoidance techniques include physical layer collision avoidance (PLCA).

In yet another aspect, each sequentially numbered available node identifier represents an unused physical network interface that is part of the bus, wherein the unused physical network interface does not connect with an available node.

In an aspect, re-numbering the original node identifiers corresponding to the secondary nodes includes: transmitting a multicast request to all the secondary nodes, where the multicast request asks each secondary node that is part of the bus-based communication system for the corresponding original node identifier, and waiting for a predefined wait time that affords an opportunity for each of the secondary nodes that are part of the bus-based communication system to respond to the multicast request.

In another aspect, re-numbering the original node identifiers corresponding to the secondary nodes includes: creating a look-up table that associates a physical address for each secondary node that is part of the bus-based communication system with a corresponding original identifier, where the look-up table lists the secondary nodes in sequential order based on the original node identifier.

In yet another aspect, re-numbering the original node identifiers corresponding to the secondary nodes includes: re-numbering the original node identifiers, which are listed in sequential order in the look-up table, into the sequentially numbered updated node identifiers.

In an aspect, the physical address is a media access control (MAC) address.

In another aspect, the bus-based communication protocol is a controller area network (CAN) bus protocol.

In yet another aspect, the primary node and the secondary nodes each include a unique microprocessor and a unique physical device.

In an aspect, the unique physical device is one of the following: a sensor and an actuator.

In another aspect, a method for implementing a re-mapping technique that re-numbers original node identifiers assigned to one or more secondary nodes that are part of a bus-based communication system is disclosed. The method includes removing, by a primary node, unused sequentially numbered available node identifiers, where a bus electrically connects the primary node and the one or more secondary nodes with one another based on a bus-based communication protocol, and where the bus-based communication protocol defines a predefined number of sequentially numbered available node identifiers, and the original node identifier assigned to each secondary node corresponds to one of the sequentially numbered available node identifiers defined by the bus-based communication protocol of the bus. The method includes re-numbering, by the primary node, the original node identifiers corresponding to the secondary nodes into sequentially numbered updated node identifiers. The method also includes re-setting, by the primary node, a total number of the sequentially numbered available node identifiers equal to a total number of secondary nodes that are part of the bus-based communication system.

In another aspect, re-numbering the original node identifiers corresponding to the secondary nodes includes: transmitting a multicast request to all the secondary nodes, where the multicast request asks each secondary node that is part of the bus-based communication system for the corresponding original node identifier, and waiting for a predefined wait time that affords an opportunity for each of the secondary nodes that are part of the bus-based communication system to respond to the multicast request.

In yet another aspect, re-numbering the original node identifiers corresponding to the secondary nodes includes: creating a look-up table that associates a physical address for each secondary node that is part of the bus-based communication system with a corresponding original identifier, where the look-up table lists the secondary nodes in sequential order based on the original node identifier.

In an aspect, re-numbering the original node identifiers corresponding to the secondary nodes includes: re-numbering the original node identifiers, which are listed in sequential order in the look-up table, into the sequentially numbered updated node identifiers.

In another aspect, a bus-based communication system is disclosed and includes a primary node, one or more secondary nodes that are each assigned an original node identifier, and a bus electrically connecting the primary node and the one or more secondary nodes with one another based on a bus-based communication protocol, where the bus-based communication protocol defines a predefined number of sequentially numbered available node identifiers, and the original node identifier assigned to each secondary node corresponds to one of the sequentially numbered available node identifiers defined by the bus-based communication protocol of the bus. The primary node implements a re-mapping technique that re-numbers the original node identifiers assigned to the secondary nodes by: removing unused sequentially numbered available node identifiers, re-numbering the original node identifiers corresponding to the secondary nodes into sequentially numbered updated node identifiers; and re-setting a total number of the sequentially numbered available node identifiers equal to a total number of secondary nodes that are part of the bus-based communication system. A total number of transmission opportunities afforded by the bus-based communication system during a periodic cycle is equal to the total number of secondary nodes that are part of the bus-based communication system.

In another aspect, the bus-based communication protocol employs one or more collision avoidance techniques that allocate a transmit opportunity to each node that is part of the bus-based communication system to avoid collisions with traffic on the bus-based communication system.

In yet another aspect, the bus-based communication protocol is 10Base-T network protocol.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
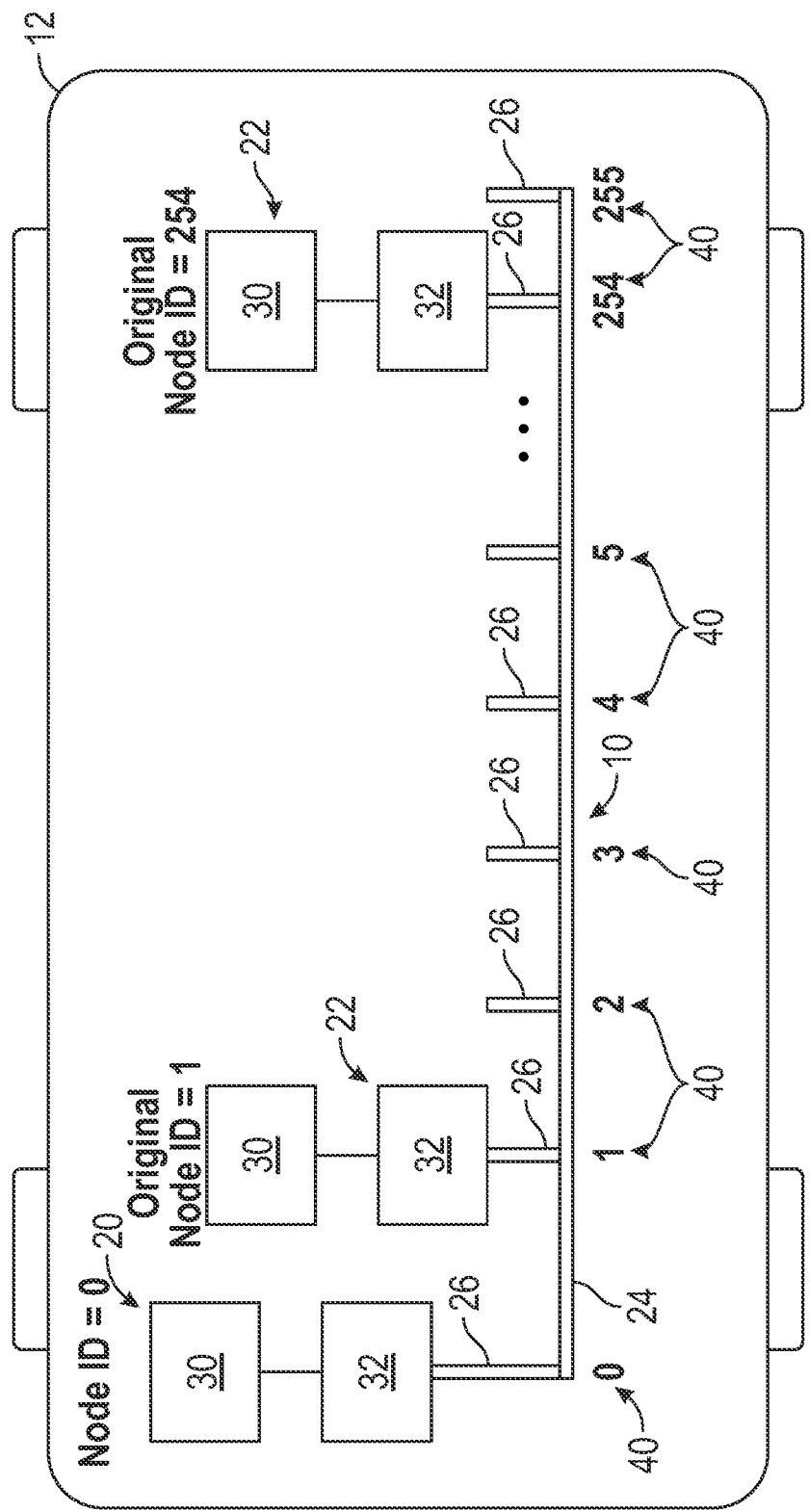
FIG. 1 is a schematic diagram of the disclosed bus-based communication system including a primary node and one or more secondary nodes that are in electronic communication with one another by a bus, according to an exemplary embodiment.

Referring to FIG. 1, a schematic diagram illustrating a bus-based communication system 10 that is part of a vehicle 12 is illustrated. The bus-based communication system 10 includes a controller or primary node 20, one or more secondary nodes 22, and a bus 24. The one or more secondary nodes 22 are in electronic communication with one another and the primary nodes 20 by the bus 24. In the non-limiting embodiment as shown in FIG. 1, the bus-based communication system 10 is part of a vehicle 12, such as, but not limited to, a sedan, truck, sport utility vehicle, van, or motor home. However, it is to be appreciated that FIG. 1 is merely exemplary in nature, and the bus-based communication system 10 is not limited to a vehicle and may be used in a variety of applications.

The bus 24 electrically connects the primary node 20 and the one or more secondary nodes 22 with one another based on a bus-based communication protocol that employs one or more collision avoidance techniques that allocate a transmit opportunity to each node that is part of the bus-based communication system 10 to avoid collisions with traffic on the bus-based communication system 10. In one specific example, the bus-based communication protocol is the 10Base-T network protocol and the collision avoidance technique is physical layer collision avoidance (PLCA). However, it is to be appreciated that other types of bus-based communication protocol may be used as well such as, for example, controller area network (CAN) bus protocol.

The bus 24 includes a plurality of physical network interfaces 26, where each physical network interface 26 connects with an available node (either the primary node 20 or one of the secondary nodes 22). It is to be appreciated that the bus-based communication protocol defines a predefined number of sequentially numbered available node identifiers 40, where each sequentially numbered available node identifier 40 corresponds to one of the physical network interfaces 26. Every sequentially numbered available node identifier 40 is afforded a periodic transmission opportunity for a periodic cycle, regardless of if a physical device (e.g., one of the secondary nodes 22) is connected to the corresponding physical network interface 26. The transmission opportunity allows a node that is connected to the corresponding sequentially numbered available node identifier 40 to transmit state information. In the example as shown in FIG. 1, the bus-based communication protocol is the 10Base-T network protocol, and therefore the predefined number of sequentially numbered available node identifiers 40 are equal to two hundred and fifty-six and are numbered as [0, 1, 2, 3, 4, 5 . . . 254, 255], however, it is to be appreciated that the predefined number of guaranteed transmission opportunities vary based on the specific bus-based communication protocol.

The primary node 20 and the secondary nodes 22 each include a unique microprocessor 30 and a unique physical device 32. The unique physical device 32 for a specific node 20, 22 is in electronic communication with and is controlled by the unique microprocessor 30. Some examples of the corresponding unique physical device 32 include, but are not limited to, a sensor, and an actuator. The primary node 20 is assigned a unique node identifier or Node ID, and the secondary nodes 22 are each assigned an original node identifier or Original Node ID. The unique node identifier and the original node identifier are both represented as a number. In the example as shown in FIG. 1, the primary node 20 is assigned the unique node identifier zero (Node ID=0), and the secondary nodes 22 are assigned original node identifier 1 and 254 (Original Node ID=1 and Original Node ID=254).

The original node identifier assigned to each secondary node 22 corresponds to a sequentially numbered available node identifier 40 defined by the bus-based communication protocol of the bus 24. It is to be appreciated that the original node identifier assigned to each secondary node 22 is not sequentially ordered, and the number of secondary nodes 22 included as part of the bus-based communication system 10 is less than the predefined number of sequentially numbered available node identifiers (e.g., there are two hundred and fifty-six available sequentially numbered available node identifiers 40 and two secondary nodes 22). In the example as shown in FIG. 1, one of the secondary nodes 22 is assigned the original node identifier one (Original Node ID=1), which corresponds to sequentially numbered available node identifier 1, and the remaining secondary node 22 is assigned the original node identifier two hundred and fifty-five (Original Node ID=255), which corresponds to the sequentially numbered available node identifier 255.

As mentioned above, the bus-based communication protocol of the bus 24 affords each sequentially numbered available node identifier 40 a periodic transmission opportunity, regardless of if a node is assigned to the corresponding physical network interface 26. However, affording each sequentially numbered available node identifier 40 a transmission opportunity introduces latency to the bus-based communication system 10 since the number of secondary nodes 22 that are part of the bus-based communication system 10 is less than the total number of sequentially numbered available identifiers 40. To reduce latency, the primary node 20 implements a re-mapping technique that re-numbers the original node identifiers assigned to the secondary nodes 22 into sequentially numbered updated node identifiers that each correspond to one of the secondary nodes 22 that are part of the bus-based communication system 10.

Figure 2:
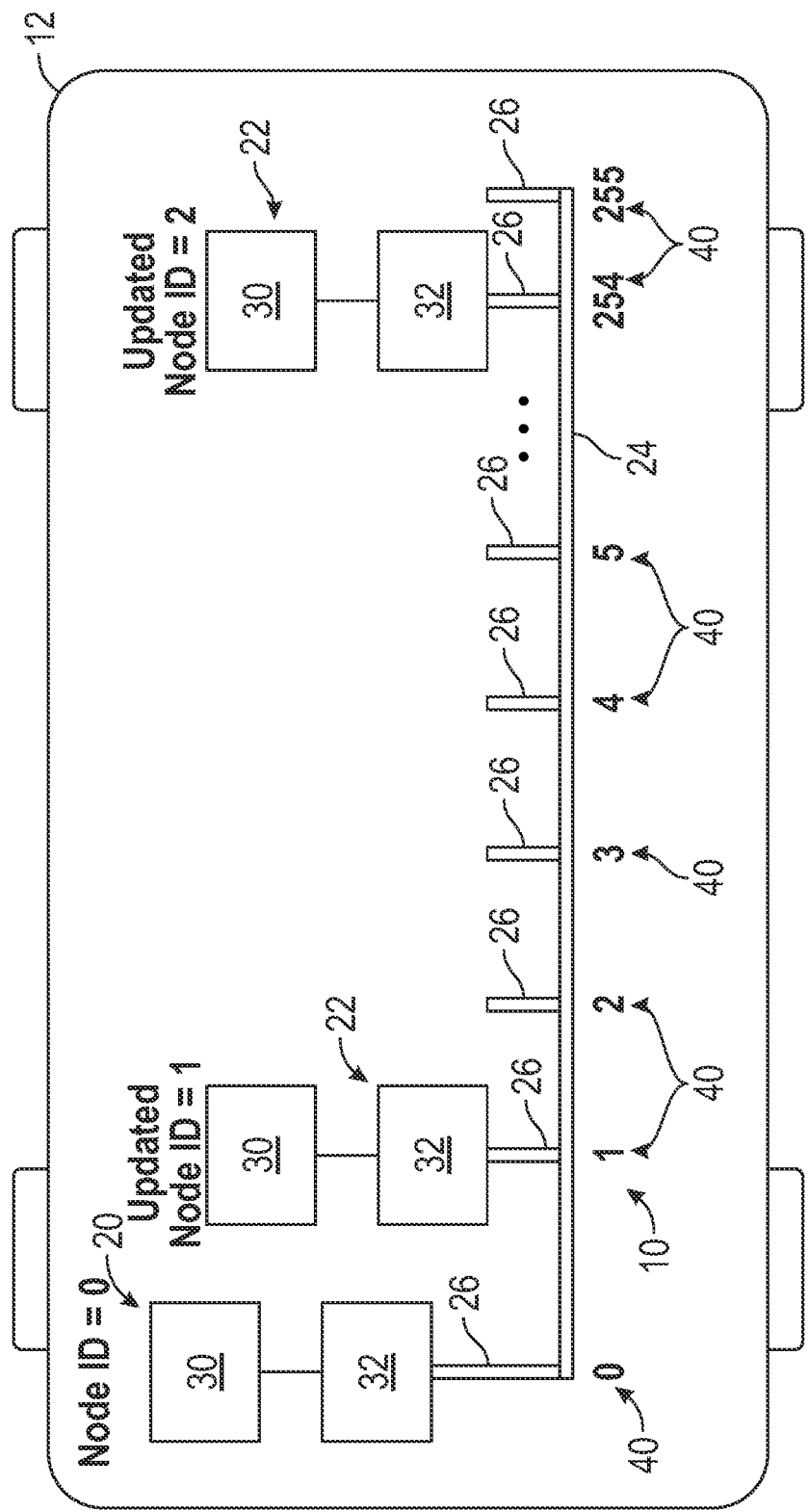
FIG. 2 illustrates the bus-based communication system shown in FIG. 1 after the primary node implements a re-mapping technique that re-numbers the original node identifiers assigned to the secondary nodes, according to an exemplary embodiment.

FIG. 2 illustrates the bus-based communication system 10 after the primary node 20 has executed the re-mapping technique that re-numbers the original node identifiers assigned to the secondary nodes 22 into sequentially numbered updated node identifiers. The original node identifiers are re-numbered by removing unused sequentially numbered available node identifiers 40. As mentioned above, each sequentially numbered available node identifier 40 represents a physical network interface 26 that is part of the bus 24, where the unused physical network interface 26 does not connect with an available node (either the primary node 20 or one of the secondary nodes 22). In the example as shown in FIG. 2, the unused sequentially numbered available node identifiers 2-253 and 255 are removed.

Figure 3:
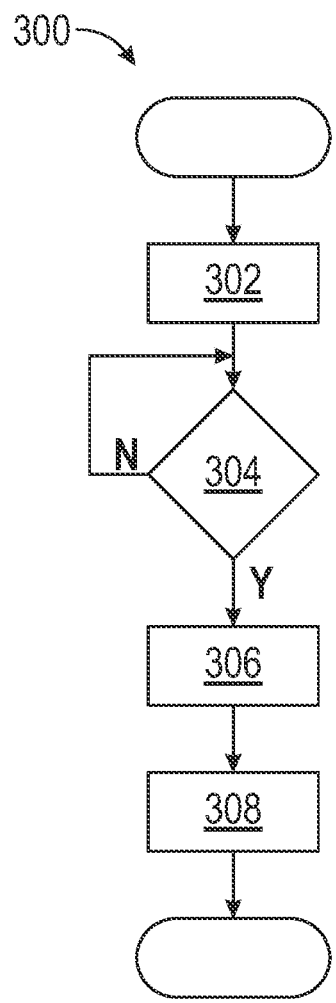
FIG. 3 is a process flow diagram illustrating a method for re-numbering the original node identifiers assigned to the secondary nodes, according to an exemplary embodiment.

The primary node 20 then re-numbers the original node identifiers corresponding to the secondary nodes 22 into sequentially numbered updated node identifiers. A process for re-numbering the original node identifiers is described below and is illustrated in FIG. 3. Referring to both FIGS. 1 and 2, the secondary nodes 22 assigned the original node identifier one (Original Node ID=1) is re-numbered as updated node identifier one (Updated Node ID=1) and the remaining secondary node 22 assigned the original node identifier two hundred and fifty-five (Original Node ID=254) is re-numbered as updated node identifier two (Updated Node ID=2). The primary node 20 re-sets the total number of the sequentially numbered available node identifiers 40 equal to a total number of secondary nodes 22 included as part of the bus-based communication system 10. In the example as shown in FIG. 2, the total number of secondary nodes 22 that are part of the bus-based communication system 10 is 2.

It is to be appreciated that the total number of transmission opportunities afforded by the bus-based communication system 10 during a periodic cycle is equal to the total number of secondary nodes 22 that are part of the bus-based communication system 10. This means that the configuration shown in FIG. 2 affords two transmission opportunities to the secondary nodes 22 assigned updated node identifiers 1 and 2, unlike the embodiment shown in FIG. 1, which affords two hundred and fifty-five transmission opportunities, thereby reducing communication latency. In one specific implementation based on the 10Base-T communication protocol, the bus time latency is improved by at least about seventy percent and the transmission latency from the secondary nodes 22 is improved by about twenty-five percent.

Re-numbering the original node identifiers corresponding to the secondary nodes 22 into sequentially numbered updated node identifiers by the primary node 20 shall now be described. Referring to FIG. 1, the primary node 20 first transmits a multicast request to all the secondary nodes 22, where the multicast request asks each secondary node 22 that is part of the bus-based communication system 10 for the corresponding original node identifier. In response to receiving the multicast request, each of the secondary nodes 22 transmits the corresponding original node identifier to the primary node 20. After a predefined wait time that affords an opportunity for each of the secondary nodes 22 that are part of the bus-based communication system 10 an opportunity to respond to the multicast request, the primary node 20 then creates a look-up table that associates a physical address for each secondary node 22 with a corresponding original identifier (Original Node ID) for each secondary node 22 that is part of the bus-based communication system 10, where the look-up table lists the secondary nodes 22 in sequential order based on the original node identifier.

Table A, which is shown below, corresponds to the example as shown in FIG. 1. Table A illustrates the physical address of each secondary node 22 as a media access control (MAC) address, where the secondary node 22 assigned the original node identifier 1 (original Node ID=1) includes the MAC address 02:xx:yy:zz:02 and the secondary node 22 assigned the node identifier 254 (original Node ID=254) includes the MAC address 03:xx:yy:zz:03.

TABLE A

| Media Access Control (MAC) address | Original Node ID |
|---|---|
| 02:xx:yy:zz:02 | 1 |
| 03:xx:yy:zz:03 | 254 |

The primary node 20 then re-numbers the original node identifiers, which are listed in sequential order in the look-up table, into the sequentially numbered updated node identifiers. In the example as shown in Table B, an additional column with the header "Updated Node ID" is introduced, where the Updated Node ID column lists the sequentially numbered updated node identifiers. In the example as shown in Table B and FIGS. 1 and 2, the secondary node assigned the original node identifier 1 (Original Node ID=1) is re-numbered and is assigned updated node identifier 1 (Updated Node ID=1). The secondary node 22 assigned the node identifier 254 (original Node ID=254) is re-numbered and is assigned updated node identifier 2 (Updated node ID=2).

TABLE B

| Media Access Control (MAC) address | Original Node ID | Updated Node ID |
|---|---|---|
| 02:xx:yy:zz:02 | 1 | 1 |
| 03:xx:yy:zz:03 | 254 | 2 |

FIG. 3 is a process flow diagram illustrating a method 300 for re-numbering the original node identifiers corresponding to the secondary nodes 22 into sequentially numbered updated node identifiers. Referring to FIGS. 1 and 3, the method 300 may begin at block 302. In block 302, the primary node 20 transmits a multicast request to all the secondary nodes 22, where the multicast request asks each secondary node 22 that is part of the bus-based communication system 10 for the corresponding original node identifier. The method 300 may then proceed to decision block 304.

In decision block 304, the primary node 20 waits for a predefined wait time, and once the predefined wait time has elapsed, the method 300 may then proceed to block 306. The predefined wait time affords an opportunity for each of the secondary nodes that are part of the bus-based communication system to respond to the multicast request.

In block 306, the primary node 20 creates a look-up table, such as Table A shown above, that associates a physical address for each secondary node 22 that is part of the bus-based communication system 10 with a corresponding original identifier, where the look-up table lists the secondary nodes 22 in sequential order based on the original node identifier. The method 300 may then proceed to block 308.

In block 308, re-numbers the original node identifiers, which are listed in sequential order in the look-up table, into the sequentially numbered updated node identifiers. In the example as shown in Table 3 above, the updated node identifiers are shown in the right-most column as "Updated Node ID". The method 300 may then terminate.

Referring generally to the figures, the disclosed bus-based communication system provides various technical effects and benefits. Specifically, the bus-based communication system significantly reduces bus time latency by re-mapping the node identifiers associated with the secondary nodes. The disclosed approach also increases architecture flexibility by allowing the nodes that are part of the bus-based communication system to be connected to, or moved onto, a different aggregator. As also mentioned above, in one specific implementation where the 10Base-T communication protocol is employed, the disclosed approach improves bus time latency by at least seventy percent and the transmission latency from the secondary nodes is improved by about twenty-five percent.

The controllers may refer to, or be part of an electronic circuit, a combinational logic circuit, a field programmable gate array (FPGA), a some or all of the above, such as in a system-on-chip. Additionally, the controllers may be microprocessor-based such as a computer having at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A bus-based communication system, comprising:
   a primary node;
   one or more secondary nodes that are each assigned an original node identifier; and
   a bus electrically connecting the primary node and the one or more secondary nodes with one another based on a bus-based communication protocol, wherein the bus-based communication protocol defines a predefined number of sequentially numbered available node identifiers, and the original node identifier assigned to each secondary node corresponds to one of the sequentially numbered available node identifiers defined by the bus-based communication protocol of the bus, wherein the primary node implements a re-mapping technique that re-numbers the original node identifiers assigned to the secondary nodes by:
   removing unused sequentially numbered available node identifiers;
   re-numbering the original node identifiers corresponding to the secondary nodes into sequentially numbered updated node identifiers; and
   re-setting a total number of the sequentially numbered available node identifiers equal to a total number of secondary nodes that are part of the bus-based communication system.

2. The bus-based communication system of claim 1, wherein a total number of transmission opportunities afforded by the bus-based communication system during a periodic cycle is equal to the total number of secondary nodes that are part of the bus-based communication system.

3. The bus-based communication system of claim 1, wherein the bus-based communication protocol employs one or more collision avoidance techniques that allocate a transmit opportunity to each node that is part of the bus-based communication system to avoid collisions with traffic on the bus-based communication system.

4. The bus-based communication system of claim 3, wherein the bus-based communication protocol is 10Base-T network protocol.

5. The bus-based communication system of claim 3, wherein the one or more collision avoidance techniques include physical layer collision avoidance (PLCA).

6. The bus-based communication system of claim 1, wherein each sequentially numbered available node identifier represents an unused physical network interface that is part of the bus, wherein the unused physical network interface does not connect with an available node.

7. The bus-based communication system of claim 1, wherein re-numbering the original node identifiers corresponding to the secondary nodes includes:
transmitting a multicast request to all the secondary nodes, where the multicast request asks each secondary node that is part of the bus-based communication system for the corresponding original node identifier; and
waiting for a predefined wait time that affords an opportunity for each of the secondary nodes that are part of the bus-based communication system to respond to the multicast request.

8. The bus-based communication system of claim 7, wherein re-numbering the original node identifiers corresponding to the secondary nodes includes:
creating a look-up table that associates a physical address for each secondary node that is part of the bus-based communication system with a corresponding original identifier, wherein the look-up table lists the secondary nodes in sequential order based on the original node identifier.

9. The bus-based communication system of claim 8, wherein re-numbering the original node identifiers corresponding to the secondary nodes includes:
re-numbering the original node identifiers, which are listed in sequential order in the look-up table, into the sequentially numbered updated node identifiers.

10. The bus-based communication system of claim 8, wherein the physical address is a media access control (MAC) address.

11. The bus-based communication system of claim 1, wherein the bus-based communication protocol is a controller area network (CAN) bus protocol.

12. The bus-based communication system of claim 1, wherein the primary node and the secondary nodes each include a unique microprocessor and a unique physical device.

13. The bus-based communication system of claim 12, wherein the unique physical device is one of the following: a sensor and an actuator.

14. A method for implementing a re-mapping technique that re-numbers original node identifiers assigned to one or more secondary nodes that are part of a bus-based communication system, the method comprising:
removing, by a primary node, unused sequentially numbered available node identifiers, wherein a bus electrically connects the primary node and the one or more secondary nodes with one another based on a bus-based communication protocol, and wherein the bus-based communication protocol defines a predefined number of sequentially numbered available node identifiers, and the original node identifier assigned to each secondary node corresponds to one of the sequentially numbered available node identifiers defined by the bus-based communication protocol of the bus;
re-numbering, by the primary node, the original node identifiers corresponding to the secondary nodes into sequentially numbered updated node identifiers; and
re-setting, by the primary node, a total number of the sequentially numbered available node identifiers equal to a total number of secondary nodes that are part of the bus-based communication system.

15. The method of claim 14, wherein re-numbering the original node identifiers corresponding to the secondary nodes includes:
transmitting a multicast request to all the secondary nodes, where the multicast request asks each secondary node that is part of the bus-based communication system for the corresponding original node identifier; and
waiting for a predefined wait time that affords an opportunity for each of the secondary nodes that are part of the bus-based communication system to respond to the multicast request.

16. The method of claim 15, wherein re-numbering the original node identifiers corresponding to the secondary nodes includes:
creating a look-up table that associates a physical address for each secondary node that is part of the bus-based communication system with a corresponding original identifier, wherein the look-up table lists the secondary nodes in sequential order based on the original node identifier.

17. The method of claim 16, wherein re-numbering the original node identifiers corresponding to the secondary nodes includes:
re-numbering the original node identifiers, which are listed in sequential order in the look-up table, into the sequentially numbered updated node identifiers.

18. A bus-based communication system, comprising:
a primary node;
one or more secondary nodes that are each assigned an original node identifier; and
a bus electrically connecting the primary node and the one or more secondary nodes with one another based on a bus-based communication protocol, wherein the bus-based communication protocol defines a predefined number of sequentially numbered available node identifiers, and the original node identifier assigned to each secondary node corresponds to one of the sequentially numbered available node identifiers defined by the bus-based communication protocol of the bus, wherein the primary node implements a re-mapping technique that re-numbers the original node identifiers assigned to the secondary nodes by:
removing unused sequentially numbered available node identifiers;
re-numbering the original node identifiers corresponding to the secondary nodes into sequentially numbered updated node identifiers; and
re-setting a total number of the sequentially numbered available node identifiers equal to a total number of secondary nodes that are part of the bus-based communication system, and wherein a total number of transmission opportunities afforded by the bus-based communication system during a periodic cycle is equal to the total number of secondary nodes that are part of the bus-based communication system.

19. The bus-based communication system of claim 18, wherein the bus-based communication protocol employs one or more collision avoidance techniques that allocate a transmit opportunity to each node that is part of the bus-based communication system to avoid collisions with traffic on the bus-based communication system.

20. The bus-based communication system of claim 19, wherein the bus-based communication protocol is 10Base-T network protocol.

\* \* \* \* \*